US007278508B2

(12) United States Patent
Nakada et al.

(10) Patent No.: US 7,278,508 B2
(45) Date of Patent: Oct. 9, 2007

(54) CONTROL SYSTEM OF INDUSTRIAL TRUCK AND CONTROLLING METHOD OF THE SAME

(75) Inventors: Takuya Nakada, Tokyo (JP); Katsumi Ueda, Tokyo (JP); Toru Saito, Tokyo (JP)

(73) Assignees: Mitsubishi Heavy Industries, Ltd., Tokyo (JP); Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 10/855,442

(22) Filed: May 28, 2004

(65) Prior Publication Data

US 2004/0261609 A1 Dec. 30, 2004

(30) Foreign Application Priority Data

May 30, 2003 (JP) ............................ 2003-153840

(51) Int. Cl.
*B60K 17/10* (2006.01)

(52) U.S. Cl. ...................................... 180/305; 180/306

(58) Field of Classification Search ................ 180/305, 180/306, 307, 308

See application file for complete search history.

(56) References Cited

U.S. PATENT DOCUMENTS

| | | | |
|---|---|---|---|
| 1,409,202 | A | 3/1922 | Sabattier |
| 2,564,002 | A | 8/1951 | Gibson |
| 2,911,053 | A | 11/1959 | Ayers et al. |
| 3,265,150 | A | 8/1966 | Westman |
| 3,507,350 | A | 4/1970 | Boyajian |
| 3,700,062 | A | 10/1972 | Garnett |
| 4,019,602 | A | 4/1977 | Habiger |
| 4,091,889 | A | 5/1978 | Brown et al. |
| 4,136,752 | A | 1/1979 | Friesen et al. |
| 4,221,277 | A | 9/1980 | Mastropieri |
| 4,355,698 | A | 10/1982 | Barnes et al. |

(Continued)

FOREIGN PATENT DOCUMENTS

| | | | |
|---|---|---|---|
| CN | 1219498 | A | 6/1999 |

(Continued)

OTHER PUBLICATIONS

U.S. Patent Application Entitled "Control System of Self Propellered Industrial Machine", Katsumi Ueda et al.

*Primary Examiner*—Christopher P. Ellis
*Assistant Examiner*—John D Walters
(74) *Attorney, Agent, or Firm*—Wenderoth, Lind & Ponack, L.L.P.

(57) ABSTRACT

A control system of an industrial truck includes a first switch, a second switch and a hydraulic circuit. The first switch detects whether an operator sits on a seat, and carries out a first operation based on the result. The second switch detects whether a device for operating an actuator is operated, and carries out a second operation based on the result. The hydraulic circuit is used for operating the actuator. It a control valve, a first circulating line, a hydraulic line and a drive lock valve. The control valve includes a spool whose position is changed by the device. The first circulating line includes the control valve, through which the hydraulic fluid circulates. The hydraulic line connects the spool with the actuator. The drive lock valve is provided for the hydraulic line and blocks the hydraulic line, based on the first operation and/or the second operation.

17 Claims, 9 Drawing Sheets

U.S. PATENT DOCUMENTS

| | | | | |
|---|---|---|---|---|
| 4,383,412 | A * | 5/1983 | Presley | 60/430 |
| 4,392,543 | A | 7/1983 | Buckhouse et al. | |
| 4,398,618 | A | 8/1983 | Hansen | |
| 4,883,137 | A | 11/1989 | Wanie et al. | |
| 5,109,945 | A | 5/1992 | Koga | |
| 5,203,440 | A | 4/1993 | Peterson, Jr. et al. | |
| 5,577,876 | A | 11/1996 | Haeder et al. | |
| 5,652,486 | A | 7/1997 | Mueller et al. | |
| 5,938,710 | A | 8/1999 | Lanza et al. | |
| 6,092,976 | A * | 7/2000 | Kamiya | 414/636 |
| 6,496,885 | B1 | 12/2002 | Smart et al. | |
| 6,553,290 | B1 | 4/2003 | Pillar | |
| 6,606,670 | B1 | 8/2003 | Stoneking et al. | |
| 6,655,351 | B2 | 12/2003 | Sheidler et al. | |
| 6,665,601 | B1 | 12/2003 | Nielsen | |
| 6,718,279 | B2 | 4/2004 | Büstgens et al. | |
| 2003/0195680 | A1 | 10/2003 | Pillar | |
| 2005/0102430 | A1 | 5/2005 | Huber et al. | |
| 2005/0254518 | A1 | 11/2005 | Fujimori | |
| 2006/0041350 | A1 | 2/2006 | Hoshaw | |
| 2006/0064215 | A1 | 3/2006 | Turski et al. | |
| 2006/0247831 | A1 | 11/2006 | Shimokoshi | |
| 2006/0260877 | A1 | 11/2006 | Ito et al. | |
| 2007/0050115 | A1 | 3/2007 | Discenzo et al. | |
| 2007/0074923 | A1 | 4/2007 | Billger et al. | |

FOREIGN PATENT DOCUMENTS

| | | |
|---|---|---|
| DE | 25 48 856 | 5/1977 |
| JP | 64-60598 | 3/1989 |
| JP | 64-60599 | 3/1989 |
| JP | 6-137423 | 5/1994 |
| JP | 7-76498 | 3/1995 |

* cited by examiner

CONTROL SYSTEM OF INDUSTRIAL TRUCK AND CONTROLLING METHOD OF THE SAME

CROSS REFERENCE

The present invention relates to U.S. patent application Ser. No. 10/855,437 entitled "CONTROL SYSTEM OF SELF PROPELLED INDUSTRIAL MACHINE" and claiming a priority based on Japanese Patent Application No. 2003-153304. These disclosures are both incorporated herein by reference.

BACKGROUND OF THE INVENTION

1. Field of the Invention

The present invention relates to a control system of an industrial truck and a controlling method of the same. More particularly, the present invention relates to a control system of the industrial truck and the controlling method of the same for an industrial truck such as a fork-lift truck.

2. Description of the Related Art

It is known that industrial trucks (vehicles), such as a fork-lift and a truck crane, work to lift and move loads by applying force as external forces directly to the loads. When these industrial trucks are operated, an operating condition for their machine elements is required to be more strict than for automobiles, such as a passenger motor car. Automobiles transport persons and luggage, but they do not apply their force directly to persons and luggage. One of the required operating conditions is a safety condition regarding safe operation. In the passenger motor car, wheel stoppage is the important safety condition. In addition, the relation between a wheel rotation state and a machine operation state is also an important safety condition in an industrial truck.

In conjunction with the above description, Japanese Laid Open Patent Application (JP-A-Heisei 07-76498) discloses the following industrial truck. In this industrial truck, safety is secured by considering a positioning relation between the industrial truck body and its operator (driver). The industrial truck includes a seat switch that outputs a seating signal corresponding to the seating of the operator on the seat of the body. The existence of the seating signal outputted by the seat switch is one element of a machine operation enabling condition. The non-existence of the seating signal (including the non-existence of the delayed seating signal) is one element of a machine operation disabling condition. This industrial truck achieves both high safety and operability.

The non-seating signal, which is outputted when the operator does not sit on a seat, can be effectively utilized. It is effective to prepare a control valve for controlling a hydraulic pressure distribution of the work machine in order to prohibit or limit the machine operation corresponding to the non-seating signal. An industrial truck with such a control valve is disclosed in Japanese Laid Open Patent Applications S64-60598, S64-60599 and U.S. Pat. No. 5,577,876.

When outputting the non-seating signal, preventing hydraulic oil in the hydraulic pressure cylinder from returning by mechanical control of the control valve should be important to secure desired safety. It is desired for simplifying a hydraulic circuit to take advantage of the conventional mechanical controlling function of the control valve.

The following are discussions of the Japanese Laid Open Patent Applications and the U.S. Patent described above.

A control method of a control valve for landing and loading for a vehicle is disclosed in the Japanese Laid Open Patent Application S64-60598. In this control method, the vehicle is controlled by preparing a switch valve in either of a pilot hydraulic oil pipe route and two pilot drainpipe routes, or in both. The control valve for landing and loading in the vehicle is controlled at the hydraulic pressure control circuit. Here, the pilot hydraulic oil pipe route provides pilot hydraulic oil to the spool of the control valve, which controls a decompression actuator. The pilot drain pipe route is prepared in response to the pilot hydraulic oil pipe route and is used for providing the pilot hydraulic oil. The switch valve is opened and closed by an electric signal which is outputted from the control apparatus on the basis of an operation signal, a seating signal and an auxiliary operation signal. The operation signal corresponds to the operation of means for landing and loading operation. The seating signal, in response to detecting that the operator sits on the seat, is outputted from the seat switch. The auxiliary operation signal is outputted from an auxiliary switch which the operator can use arbitrarily when he does not sit. The control valve for landing and loading in the vehicle is controlled by this control method as follow. When the seating signal or the auxiliary operation signal are inputted to the control apparatus continuously for a predetermined time, a control signal which corresponds to the operation of the means for carrying out the landing and loading operation is outputted to the switch valve. When the means of landing and loading operation is operated before the seating signal, or the auxiliary operation signal is inputted to the control apparatus, or when the seating signal or the auxiliary operation signal is inputted to the control apparatus during the operation and the input continues for a predetermined time, the control signal, in low level, is outputted to the switch valve at first, and the level of the control signal is gradually raised in accordance with the present amount of operation of the means of landing and loading.

Further, a control method of a control valve for landing and loading for vehicle is also disclosed in Japanese Laid Open Patent Application S64-60599 as a related technique. In this control method, the vehicle is controlled by preparing a switch valve in either of a pilot hydraulic oil pipe route and two pilot drain pipe routes, or in both. The control valve for landing and loading in the vehicle is controlled at the hydraulic pressure control circuit. Here, the pilot hydraulic oil pipe route provides pilot hydraulic oil to the spool of the control valve, which controls a decompression actuator. The pilot drain pipe route is prepared in response to the pilot hydraulic oil pipe route and is used for providing the pilot hydraulic oil. The switch valve is opened and closed by an electric signal which is outputted from the control apparatus on the basis of an operation signal, a seating signal and an auxiliary operation signal. The operation signal corresponds to the operation of means of landing and loading operation. The seating signal, in response to detecting that the operator sits on the seat, is outputted from the seat switch. The auxiliary operation signal is outputted from an auxiliary switch which the operator can use arbitrarily when he does not sit. The control valve for landing and loading in the vehicle is controlled by this control method as follows. When the seating signal from the seat switch or the auxiliary operation signal from the auxiliary switch are inputted to the control apparatus, a control signal which corresponds to the operation of the means of landing and loading operation is outputted to the switch valve. When the means of landing and loading operation is operated before the seating signal from the seating switch or the auxiliary operation signal from the auxiliary switch is inputted to the control apparatus, or when the seating signal or the auxiliary operation signal is inputted to the control apparatus during operation, the control signal, at low level, is outputted to the switch valve at first, and the level of the control signal is gradually raised in accordance with a present amount of operation of the means of landing and loading.

Further, a control apparatus of a fork-lift is disclosed in Japanese Laid Open Patent Application H7-76498 as a related technique. The fork-lift includes a seating switch which is switched ON and OFF according to the seating or non-seating of the operator. The control apparatus determines permission or prohibition of the operation of the machine for loading and landing work on the basis of the ON/OFF state of this seating switch. The operation is possible to be permitted immediately when the seat switch switches to either state of ON and OFF by the operator's seating. On the other hand, being switched to the other by an operator's standing, and continuing in this state for a predetermined time, results in the operation being prohibited.

Furthermore, in conjunction with the above description, U.S. Pat. No. 5,577,876 discloses the following technique. In a skid steer loader of the type having a control apparatus for controlling movement of a lift arm on the skid steer loader, an improvement includes a power actuator means, a hydraulic power circuit, a sensor, a power interruption means and manually operable bypass means. The power actuator means is coupled to the lift arm for moving the lift arm along a path. The hydraulic power circuit is coupled to the power actuator means, providing hydraulic power to the power actuator means, along a first power path, to move the lift arm in a first direction. The sensor is coupled to the skid steer loader for sensing a desired parameter and providing a sensor signal indicative of the desired parameter. The power interruption means includes a first hydraulic valve coupled in the first power path to the power actuator means and the sensor for interrupting power to the power actuator means based on the sensor signal. The manually operable bypass means includes a second hydraulic valve coupled to the hydraulic power circuit and the power actuator means for providing a second power path between the hydraulic power circuit and the power actuator means, bypassing the power interruption means to allow movement of the lift arm.

SUMMARY OF THE INVENTION

Therefore, an object of the present invention is to provide a control system of an industrial truck that can prevent hydraulic oil in the hydraulic pressure cylinder from returning by mechanical control of the control valve to secure desired safety, and a controlling method of the same.

Another object of the present invention is to provide a control system of an industrial truck that can maintain the simplicity of a hydraulic circuit having the advantage of the conventional mechanical controlling function of the control valve to achieve the above object, and a controlling method of the same.

These and other objects, features and advantages of the present invention will be readily ascertained by referring to the following description and drawings.

In order to achieve an aspect of the present invention, the present invention provides a control system of an industrial truck including a first switch, a second switch and a hydraulic circuit. The first switch is provided for a (vehicle) body. The first switch detects whether or not an operator sits down on a seat, and carries out a first operation based on the detection result of the first switch. The second switch is provided for the main body. The second switch detects whether or not a device for operating an actuator is operated, and carries out a second operation based on the detection result of the second switch. The hydraulic circuit is used for operating the actuator and contains hydraulic fluid. The hydraulic circuit includes a control valve, a first circulating line, a hydraulic line and a drive lock valve. The control valve includes a spool whose position is changed by the device. The first circulating line includes the control valve. The hydraulic fluid circulates through the first circulating line. The hydraulic line connects the spool with the actuator, wherein the hydraulic fluid passes through the hydraulic line. The drive lock valve is provided for the hydraulic line. The drive lock valve blocks the hydraulic line, based on one of the first operation and the first and second operations.

In the control system of an industrial truck according to the present invention, the drive lock valve blocks the hydraulic line by closing the drive lock valve, under a condition that the first switch does not carry out the first operation.

In the control system of an industrial truck according to the present invention, the first operation is to output a first signal indicating that the operator sits down on the seat. The second operation is to output a second signal indicating that the device for operating an actuator is operated.

In the control system of an industrial truck according to the present invention, the first operation is carried out when a predetermined time period passes since just after a first status changes to a second status. The first status indicates that the first switch is detecting that the operator sits down on the seat. The second status indicates that the first switch is detecting that the operator does not sit down on the seat.

In the control system of an industrial truck according to the present invention, the hydraulic circuit further includes a second circulating line and an unloading valve. The second circulating line is connected in parallel with the first circulating line, and does not include the control valve. The hydraulic fluid bypasses the control valve through second circulating line. The unloading valve operates in response to the first operation, and is included in the second circulating line. The unloading valve is opened to connect a point upstream of the unloading valve with a hydraulic fluid tank directly, based on one of the first operation and the first and second operations.

In the control system of an industrial truck according to the present invention, the unloading valve is opened to connect a point upstream of the unloading valve with the hydraulic fluid tank directly under a condition that the first switch does not carry out the first operation.

The control system of an industrial truck according to the present invention further includes a controller which controls the drive lock valve and the unloading valve based on the one of the first operation and the first and second operations.

In the control system of an industrial truck according to the present invention, the second switch outputs an electric signal corresponding to operational positions of the device.

In the control system of an industrial truck according to the present invention, the actuator is operated in a certain direction by using gravity against a machine element.

In the control system of an industrial truck according to the present invention, the machine element is one of a crane arm of a truck crane, a shovel of a shovel type excavator, a fork of a fork-lift truck, a ladder of a fire-fighting vehicle, a hatch of a refuse collector and a ramp of a car carrier.

In order to achieve another aspect of the present invention, the present invention provides a controlling method of an industrial truck. Here, the industrial truck includes a first switch which is provided for a (vehicle) body, a second switch which is provided for the body and a hydraulic circuit which is used for operating of the actuator and includes hydraulic fluid. The hydraulic circuit includes a control valve, a first circulating line, a hydraulic line and a drive lock valve. The control valve includes a spool whose position is changed by the operating device. The first circulating line includes the control valve, wherein the hydraulic fluid circulates through the first circulating line. The hydraulic line connects the spool with the actuator, wherein the hydraulic fluid passes through the hydraulic line. The drive lock valve is provided for the hydraulic line. The controlling method includes (a) detecting whether or not an operator sits down on a seat, and carries out a first operation based on the detection result by the first switch; (b) detecting whether or not a device for operating an actuator is operated, and carries out a second operation based on the detection result by the second switch; and (c) carries out blocking of the hydraulic line by using the drive lock valve, based on one of the first operation and the first and second operations.

In the controlling method of an industrial truck according to the present invention, the step (c) includes: (c1) closing the drive lock valve to block the hydraulic line under a condition that the first switch does not carry out the first operation.

In the controlling method of an industrial truck according to the present invention, the first operation is to output a first signal indicating that the operator sits down on the seat. The second operation is to output a second signal indicating that the device for operating an actuator is operated.

In the controlling method of an industrial truck according to the present invention, the step (a) includes: (a1) detecting a first status that the operator sits down on the seat, (a2) detecting a second status that the operator does not sit down on the seat, and (a3) carrying out the first operation when a predetermined time period passes since just after the first situation changes to the second situation.

In the controlling method of an industrial truck according to the present invention, the first operation takes priority over the second operation in step (c).

In the controlling method of an industrial truck according to the present invention, the actuator is operated in a certain direction by using gravity against a machine element.

In the controlling method of an industrial truck according to the present invention, the step (b) includes (b1) detecting whether or not a device for operating an actuator is operated in a predetermined direction, and (b2) carrying out a second operation when the device is operated in the predetermined direction.

The controlling method of an industrial truck according to the present invention further includes (d) opening an unloading valve to connect an upstream of the unloading valve with an hydraulic fluid tank directly, based on one of the first operation and the first and second operations. The unloading valve is included in a second circulating line, and operates in response to the first operation. The second circulating line is connected in parallel with the first circulating line, and does not include the control valve, wherein the hydraulic fluid bypasses the control valve through a second circulating line.

In the controlling method of an industrial truck according to the present invention, the step (d) includes (d1) opening the unloading valve to connect a point upstream of the unloading valve with the hydraulic fluid tank directly, under a condition that the first switch does not carry out the first operation.

DESCRIPTION OF THE PREFERRED EMBODIMENTS

Embodiments of a control system of an industrial truck and a controlling method of the same according to the present invention will be described below with reference to the attached drawings.

Firstly, the configuration of the embodiment of the control system of the industrial truck according to the present invention will be described.

Figure 1:
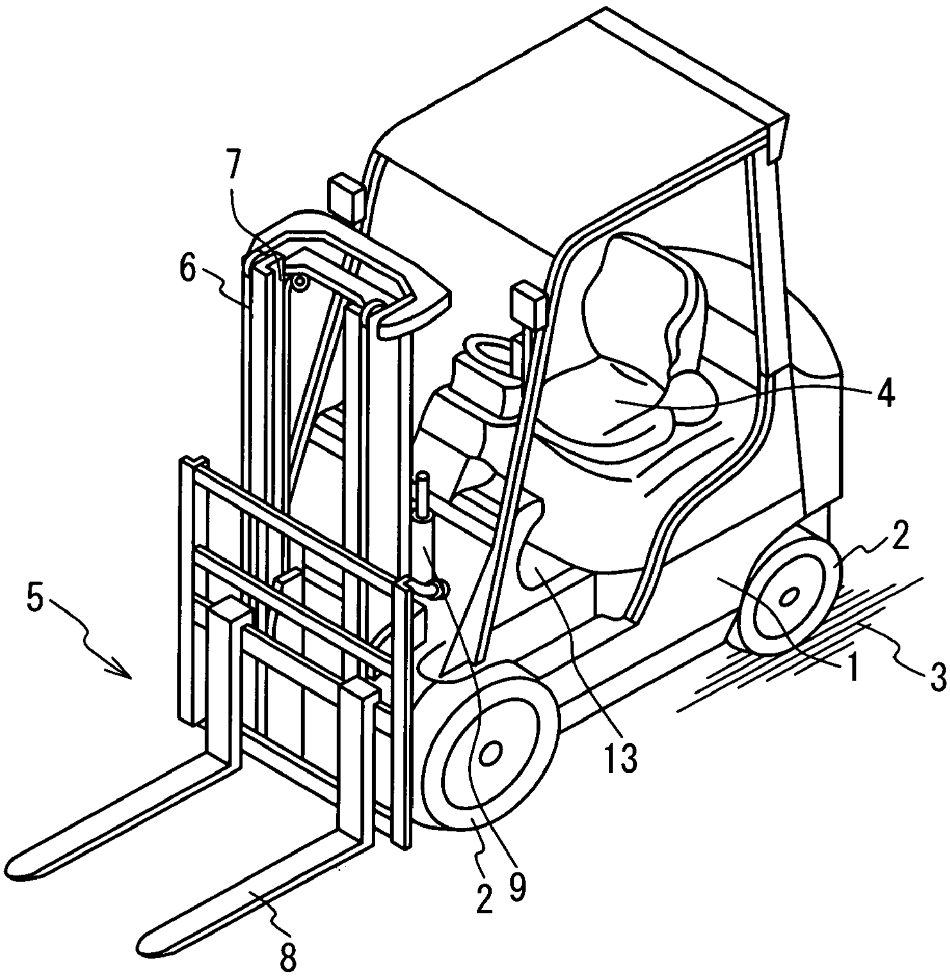
FIG. 1 is a schematic view showing a fork-lift truck as an industrial truck to which the control system of the present invention is applied.

FIG. 1 is a schematic view showing a fork-lift truck as an industrial truck to which the control system of the present invention is applied.

The main body 1 of the fork-lift truck (industrial truck) is provided with a machine element (5) and a seat 4. The main body 1 runs on the ground surface 3 such as a road surface (including an off-road surface) with wheels 2. Wheels 2 can run on the ground surface 3 with caterpillar tracks.

Other examples of industrial trucks are a truck crane, a shovel type excavator, a fire-fighting vehicle, a refuse collector and a car carrier. The machine elements of these industrial trucks are a crane arm of the truck crane, a shovel of the shovel type excavator, a ladder of the fire-fighting vehicle, a hatch of the refuse collector and a ramp of the car carrier. However, the present invention is not limited to these examples.

The seat 4 is arranged at a proper portion of the main body 1. A driver or an operator sits on the seat 4. The main body 1 is equipped with the fork lift 5 as the work machine. The fork lift 5 is composed of an outer mast 6, an inner mast 7 and a fork 8. The inner mast 7 is lifted up and down in the vertical direction guided by the outer mast 6. The fork 8 is lifted up and down supported by the inner mast 7 in an integrated manner with the inner mast 7. The inner mast 7 is driven to lift up and down by a lift cylinder 9.

Figure 2:
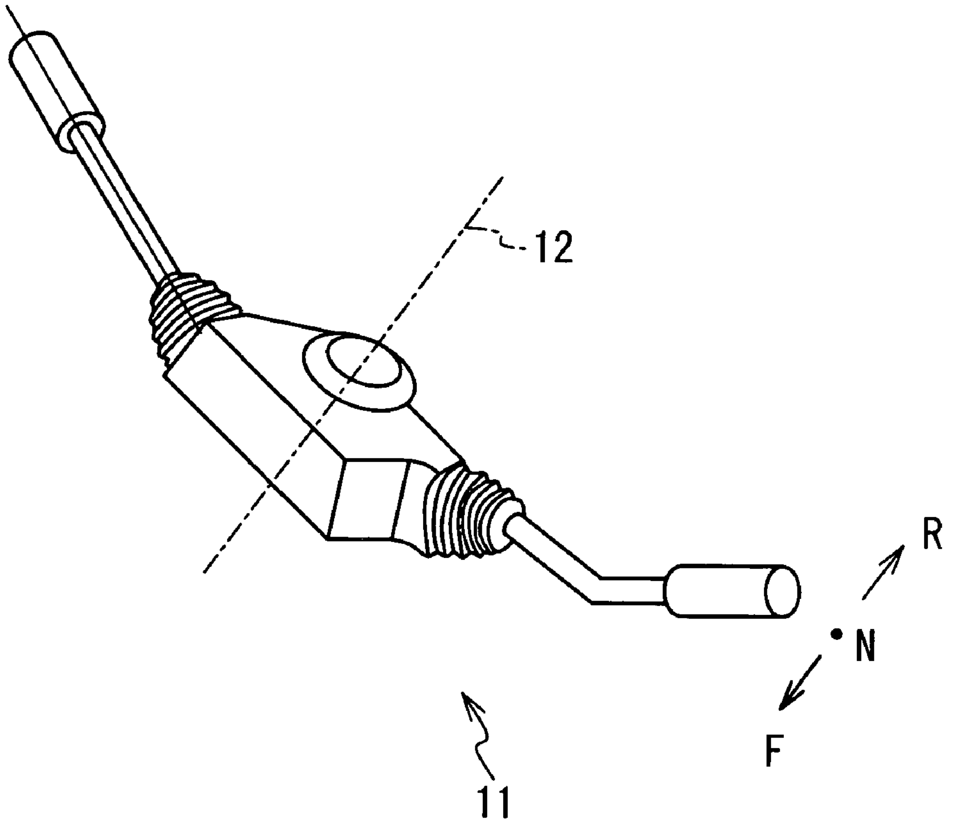
FIG. 2 is a schematic view showing a forward and reverse handle lever.

A forward and reverse handle lever 11 is arranged in front of the seat 4. The forward and reverse handle lever 11 is supported so as to be rotatable against the main body 1. FIG. 2 is a schematic view showing the forward and reverse handle lever 11. The forward and reverse handle lever 11 rotates around an axis of rotation 12 with a reciprocating motion. The axis of rotation has a vertical direction or an inclined direction relative to the vertical direction. A clockwise rotation of the forward and reverse handle lever 11 corresponds to a forward position F corresponding to forward movement of the main body 1. A counterclockwise rotation of the forward and reverse handle lever 11 corresponds to a reverse position R corresponding to reverse movement of the main body 1. The forward and reverse handle lever 11 can be stayed stably at a neutral position N.

A foot stand 13 is arranged in a front and lower position of the seat 4 in the main body 1. Sitting on the seat 4, the operator puts his legs on the foot stand 13. The operator can stand on the foot stand 13 when standing up from the seat 4. The operator getting on and off the main body 1 might accidentally touch other driving apparatus for the machine element which is arranged around the forward and reverse handle lever 11 or the foot stand 13.

Figure 3:
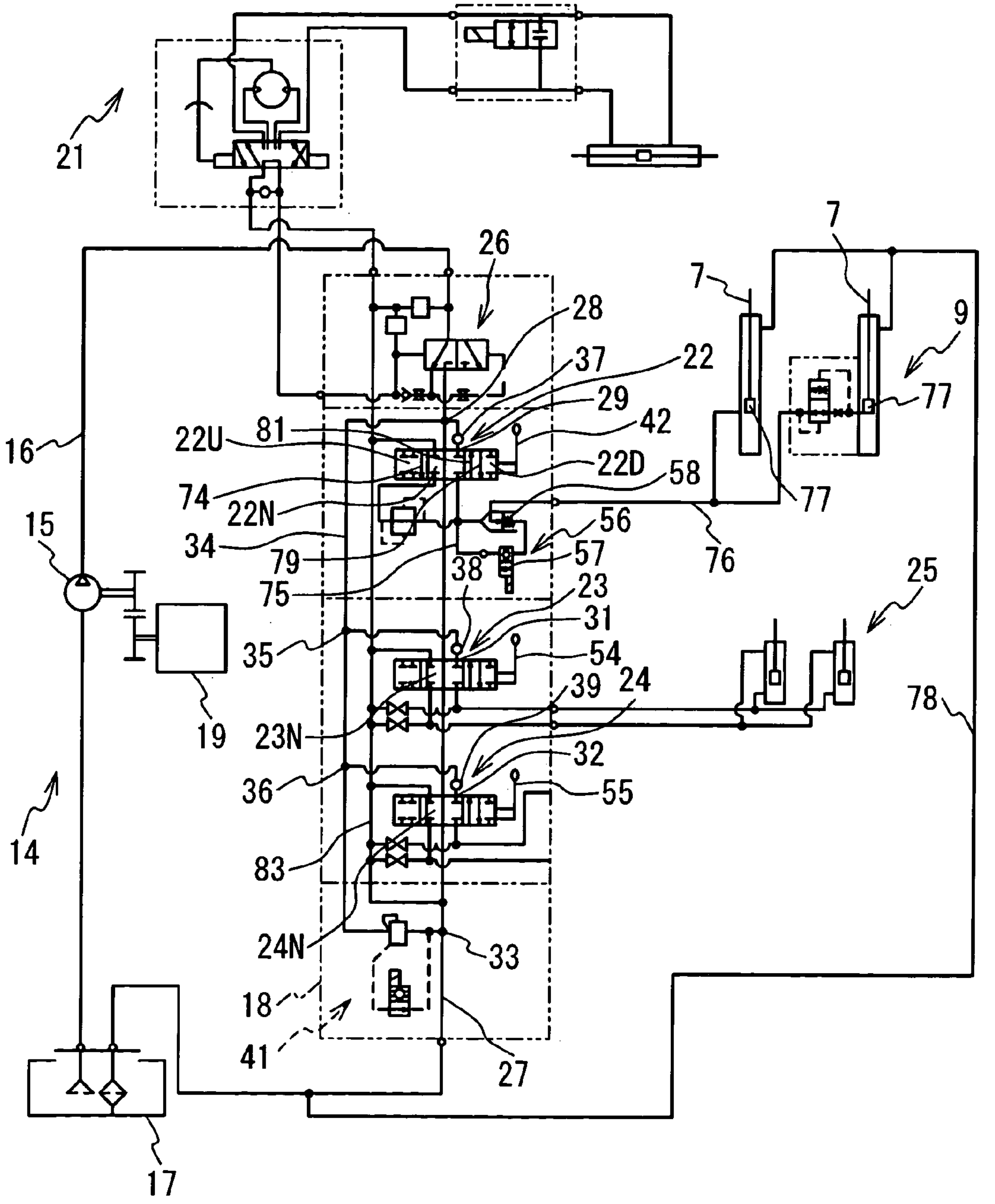
FIG. 3 is a schematic view showing a hydraulic circuit to drive a plurality of working components for the fork lift.

FIG. 3 is a schematic view showing a hydraulic circuit 14 to drive a plurality of working components for the fork lift 5. The main body 1 is equipped with a hydraulic circuit 14 and a hydraulic oil circulating circuit 16 including a pump 15. The pump 15, an oil tank 17 and control valves 18 are connected with each other through hydraulic oil circulation pipes (lines) which are included in the hydraulic oil circulating circuit 16. The pump 15 is coupled to an engine 19. The engine 19 as a motor is not an electric motor, but is an internal-combustion engine (for example, a gasoline engine, a diesel engine, or a hybrid engine combined with an electric motor). The hydraulic circuit 14 includes a steering valve circuit 21 which connects in parallel to the hydraulic oil circulating circuit 16.

The control valves 18 are composed of a first control valve 22, a second control valve 23 and a third control valve 24. The first control valve 22 selectively forms a first hydraulic oil route switching circuit which switches (changes) the movement up and down of the lift cylinder 9. The second control valve 23 selectively forms a second hydraulic oil route switching circuit which switches a tilt position of a tilt cylinder 25. The tilt position can be switched (changed) continuously. The third control valve 24 selectively forms a third hydraulic oil route switching circuit that switches a drive state of another drive portion (not shown). The tilt cylinder 25 can adjust an angle of the outer mast 6 to the vertical surface. A fourth control valve 26 can selectively distribute the hydraulic oil to the hydraulic circuit 14 and the steering valve circuit 21.

The first control valve 22 includes a three-position selection valve. The three-position selection valve includes a spool which is selectively positioned in one of three positions. The three positions correspond to the three routes of the first hydraulic oil route switching circuit. In FIG. 3, the spool is positioned in the neutral position among the three positions. The hydraulic oil is pumped out of the oil tank 17 by the pump 15. It is distributed to the control valves 18 by the fourth control valve 26. It is refluxed to the oil tank 17 through a reflux line 27 that is a part of the hydraulic oil circulating circuit 16. The reflux line 27 is composed of the neutral position 22N of the first control valve 22, a neutral position 23N of the second control valve 23 and a neutral position 24N of the third control valves 24.

A three-direction distributor 28 is provided upstream of the first control valve 22 in the hydraulic oil circulating circuit 16, between the fourth control valve 26 and the first control valve 22. The three-direction distributor 28 can simultaneously supply pressured hydraulic oil to each of a first hydraulic oil supplying port 29 of the first control valves 22, a second hydraulic oil supplying port 31 of the second control valve 23 and a third hydraulic oil supplying port 32 of the third control valve 24. A two-direction reflux gatherer 33 is provided downstream part of the third control valve 24 in the hydraulic oil circulating circuit 16, between the third control valve 24 and the oil tank 17. The three-direction distributor 28 connects with the two-direction reflux gatherer 33 through a reflux route line 34. The three-direction distributor 28 connects with each of the second hydraulic oil supplying port 31 and the third hydraulic oil supplying port 32 through each of nodes 35 and 36 in the reflux route line 34, respectively. The connection does not make any resistance to the hydraulic oil, except for unintended resistance such as piping resistance (which is ignored). A first check valve 37 is provided between the three-direction distributor 28 and the first hydraulic oil supplying port 29. A second check valve 38 is provided between the node 35 and the second hydraulic oil supplying port 31. A third check valve 39 is provided between the node 36 and the third hydraulic oil supplying port 32.

An unloading valve 41 is provided downstream of the node 36 in the reflux route line 34, between the node 36 and the two-direction reflux gatherer 33. If an unloading signal, which will be described later, is not supplied to the unloading valve 41, the unloading valve 41 releases the reflux route line 34, and the three-direction distributor 28 connects with the two-direction reflux gatherer 33 without resistance.

Figure 4:
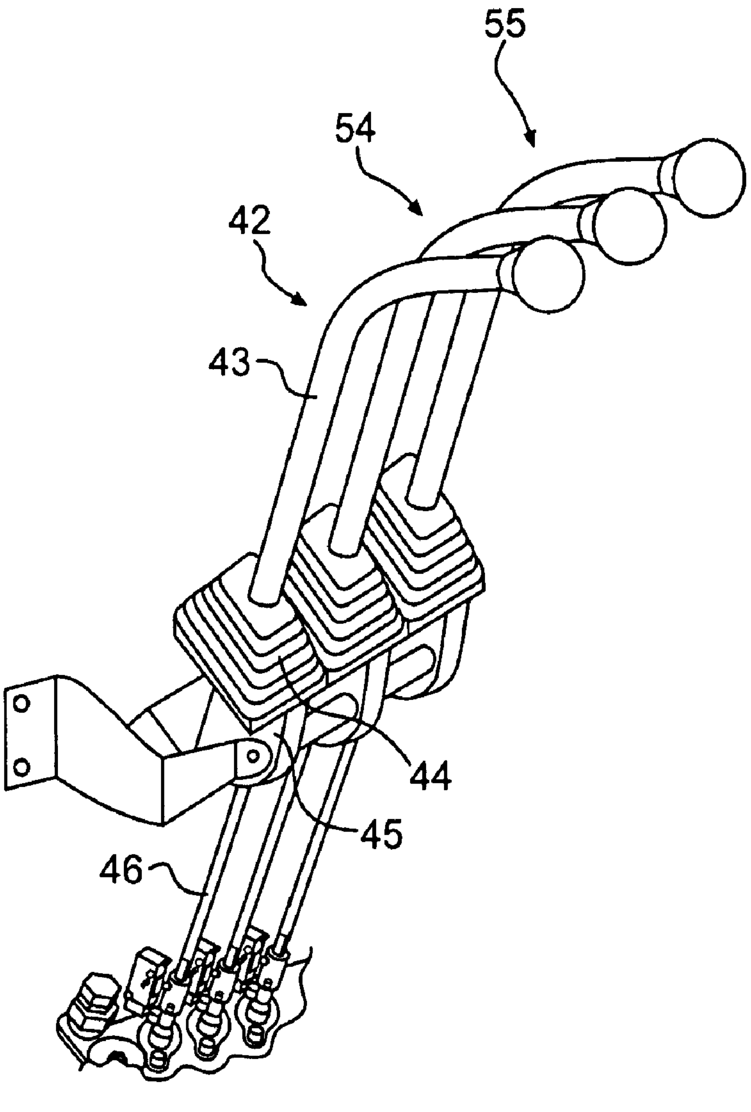
FIG. 4 is a schematic view showing a manual handle lever.

Switching of the three positions of the first control valve 22 is by a manual handle lever 42 FIG. 4 is a schematic view showing the manual handle lever 42. The manual handle lever 42 is provided as one of a plurality of manual handle levers. The manual handle lever 42 is composed of an inclining handle lever 43, an inclining support element 44, a movement converter 45, and a forward and backward link 46. The inclining handle lever 43 is operated with inclined movement by the operator's fingers. The inclining support element 44 supports the inclining handle lever 43 to be inclined freely. The movement converter 45 converts the inclining movement of the inclining handle lever 43 into rectilinear movement. The forward and backward link 46 moves rectilinearly corresponding to the inclined movement of the inclining handle lever 43 converted by the movement converter 45. The forward and backward movement of the forward and backward link 46 corresponds to the change between the three positions of the first control valve 22 as shown in FIG. 3.

Figure 5:
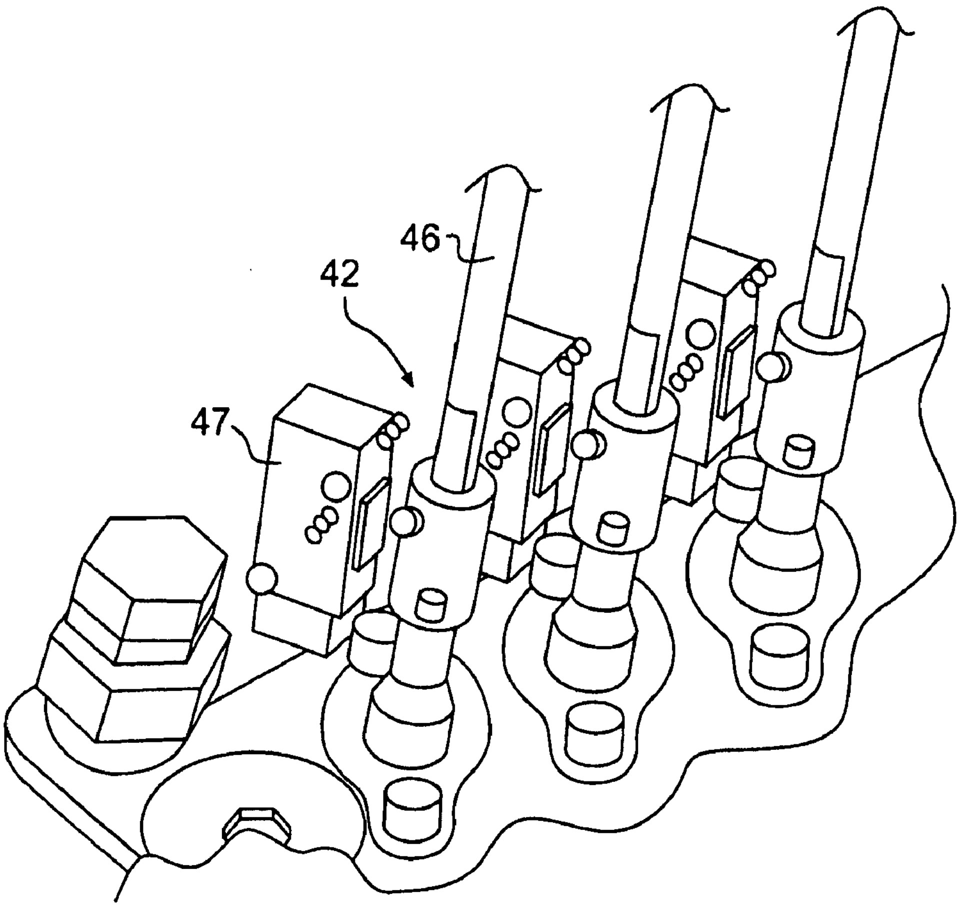
FIG. 5 is a schematic view showing an end portion of a forward and backward link.

The manual handle lever 42 has another important function in addition to the valve operation function. FIG. 5 is a schematic view showing an end portion of the forward and backward link 46. A direction detecting switch 47 is fixed to the main body (fixed portion) of the first control valve 22 (not shown in this figure) near the end portion of the forward and backward link 46. The direction detecting switch 47 detects a direction of the movement of the manual handle lever 42.

Figure 6:
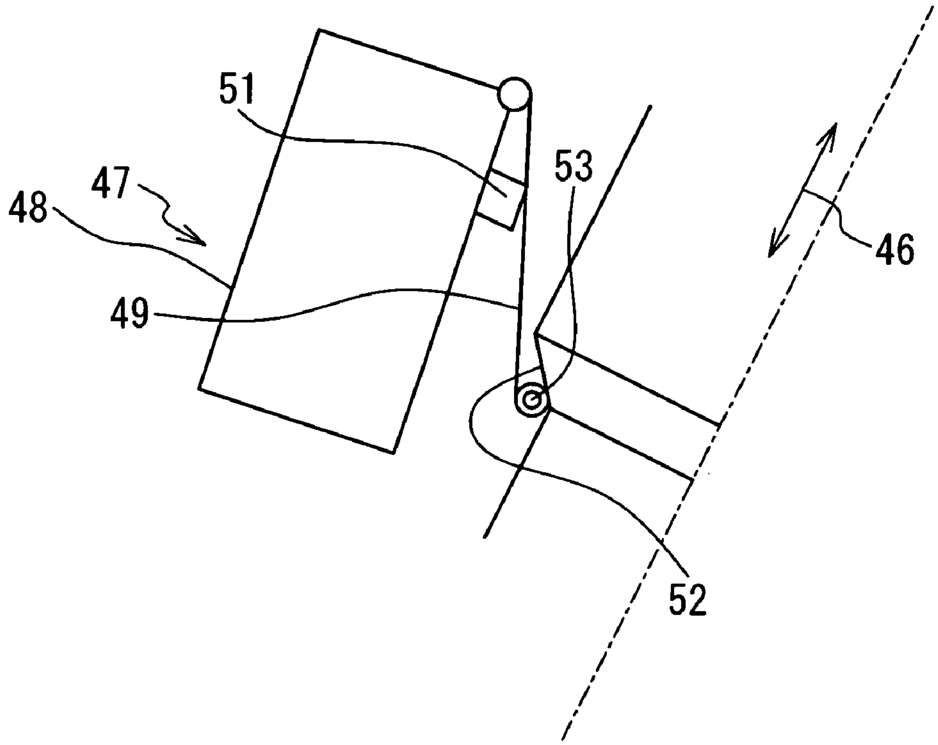
FIG. 6 is a schematic view showing a the direction detecting switch.

FIG. 6 is a schematic view showing the direction detecting switch 47. The direction detecting switch 47 is composed of a switch box 48, a switch lever 49 and a contact type switch button 51. The switch lever 49 is supported by the case of the switch box 48 with an axis pin and can be inclined freely. The forward and backward link 46 has a slope 52 at its peripheral area. A roller 53 is fixed on a freely inclining end of switch lever 49 and can rotate freely. The roller 53 rolls on the slope 52 when the forward and backward link 46 moves forward and backward. When the inclining handle lever 43 is pulled (in the driver direction) and the forward and backward link 46 moves forward in the movement direction (downward in the vertical direction), the switch lever 49 is inclined together with the roller 53 rolling on the slope 52. The contact type switch button 51 is pushed into the switch box 48 to turn on an electric contact type switch in the switch box 48. In this way, the manual handle lever 42 can detect a lifting down operation and generate a lifting down order signal (an operation start signal described later) that indicates an order to drive pistons (not shown in drawings) of the lift cylinder 9 in the lift down direction. The switching operations of the other manual handle levers 54 and 55 (refer to FIG. 3 and FIG. 4) are the same as that of the manual handle lever 42. The manual handle lever 54 can generate a signal (another operation start signal) to drive the tilt cylinder 25. The manual handle lever 55 can generate a signal (still another operation start signal) to drive another actuator.

The control system of the industrial truck according to the present invention includes a lift lock valve 56 as shown in FIG. 3. The lift lock valve 56 is provided between the lift cylinder 9 and a lifting down direction portion 22D of the first control valve 22. The lifting down direction portion 22D is moved to the movement position (a position where the neutral portion 22N is set in FIG. 3) by the lifting down operation of the manual handle lever 42. The lift lock valve 56 is provided as a pocket valve that opens or closes corresponding to a binary lock signal. That is, it is composed of a lock operation valve 57 and a switch valve 58. The look operation valve 57 is changed to two positions corresponding to the binary lock signal. The switch valve 58 is opened or closed corresponding to the changing position of the lock operation valve 57. The binary signal (a drive lock signal described later) is generated and outputted by a controller 61 (described later) based on the operation start signal 59 (referring to FIG. 7). The operation start signal 59 is generated by the direction detecting switch 47 corresponding to moving in and out of the contact type switch button 51 which corresponds to the two inclining position of the switch lever 49. The operation start signal 59 is concretely generated as a mast lifting down signal or the fork lifting down signal.

Figure 7:
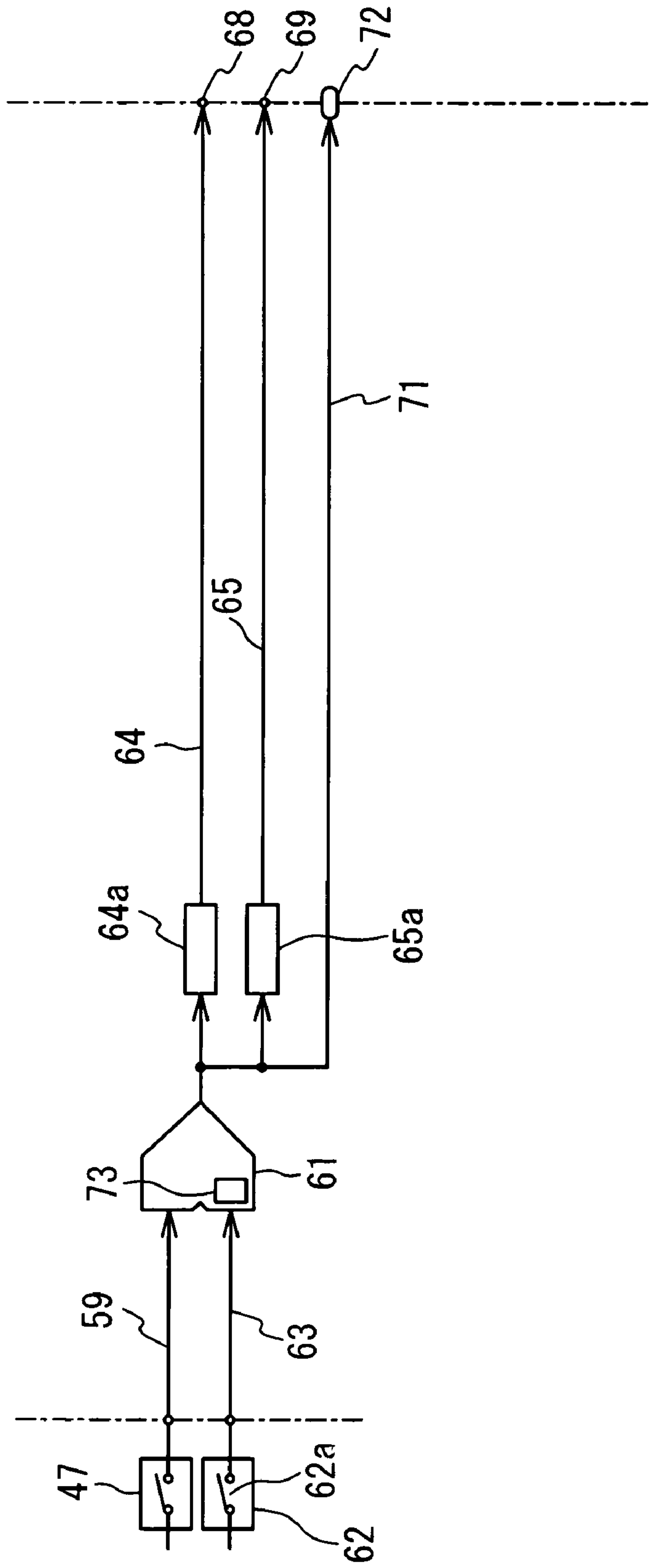
FIG. 7 is a schematic block diagram showing the logic of a controller.

FIG. 7 is a schematic block diagram showing logic of the controller 61. The controller 61 includes a seat delay counter 73 that counts the seconds by using its built-in clock. In FIG. 7, an unloading signal generating process 64*a* and a drive lock signal generating process 65*a* are clearly indicated, which are the processes that the controller 61 executes. The controller 61 includes the means which executes these processes (not shown). A logic circuit 62 including a seat switch 62*a* and the direction detecting switch 47 is connected with the controller 61. The Logic circuit 62 is embedded in the seat 4. Here, the logic circuit 62 (the seating switch 62*a*) senses (detects) the weight of the operator sitting on (riding on and boarding on) the main body 1 so as to output an operator boarding signal (the seating signal) 63. The seating signal 63 is generated by the seat switch 62*a* (for example, a plane-type contact switch (not shown)), which is pushed down by the weight of the operator's body sitting on the seat 4. The direction detecting switch 47 outputs the operation start signal 59 based on the motion of the manual handle lever 42 as mentioned above. The operation start signal 59 is supplied to the controller 61 together with the seating signal 63. The controller 61 executes the unloading signal generating process 64*a* and generates the unloading signal 64 by a logic process described later, based on the operation start signal 59 and the seating signal 63. The unloading signal 64 drives the unloading valve 41. The unloading signal 64 is outputted through a signal line to an unloading solenoid 68 to drive the unloading valve 41. The controller 61 executes the drive lock signal generating process 65*a* and generates the drive lock signal 65 by a logic process described later, based on the operation start signal 59 and the seating signal 63. The drive lock signal 65 drives the lift lock valve 56. The drive lock signal 65 is outputted through a signal line to a drive lock solenoid 69 to drive the lift lock valve 56. Also, the controller 61 outputs a mast lock alarm signal 71 to an alarm 72 by the logic process which is also described later, based on the operation start signal 59 and the seating signal 63.

Figure 8:
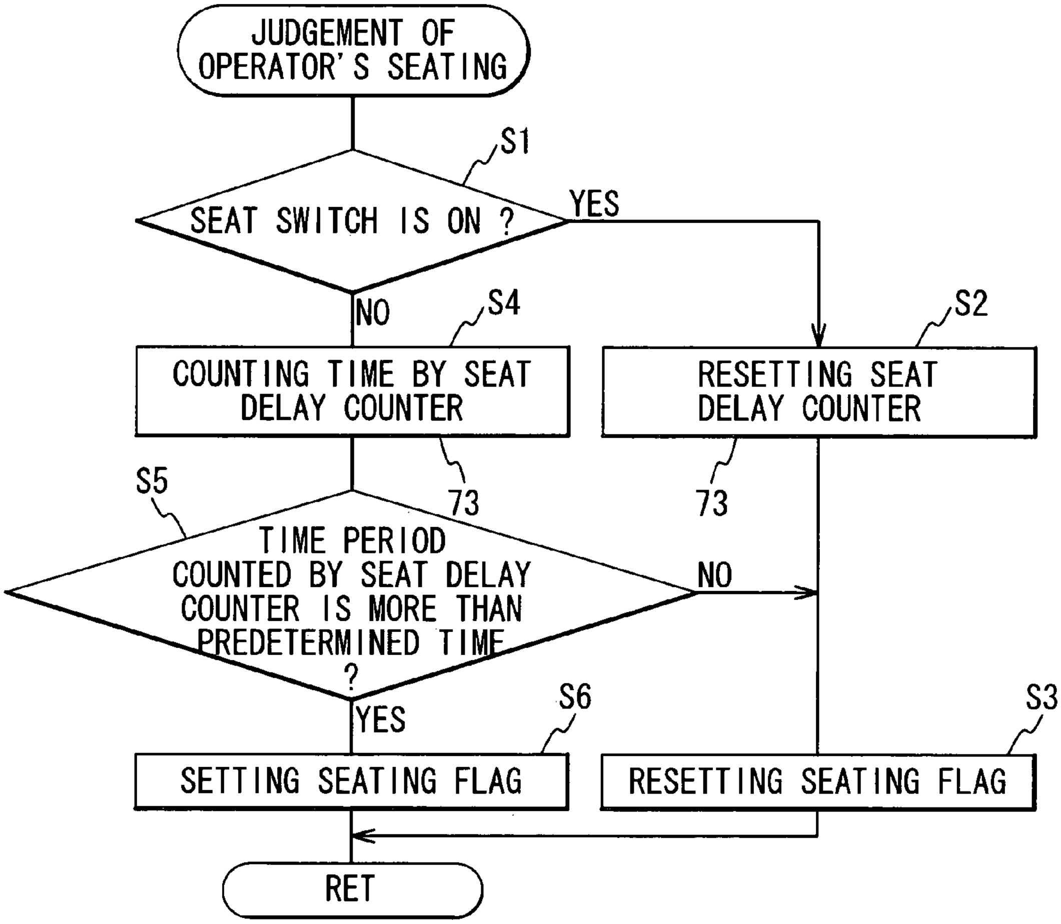
FIG. 8 is a flowchart showing a method for generating a seating signal.

FIG. 8 is a flowchart showing a method for generating the seating signal 63 (The judgement of the operator's seating). When the operator sits on the seat 4, the seat switch 62*a* is turned on and the seating signal 63 is outputted.

In step S1, the controller 61 judges whether or not the seat switch 62*a* is ON. When judging that the seat switch 62*a* is ON (judging that the operator is sitting, step S1: YES), the controller 61 resets the seat delay counter 73 to zero in Step S2. Then, the controller 61 sets a seating flag in Step 3.

When judging that the seat switch 62*a* is not ON (judging that the operator is not sitting, step S1: NO), the controller 61 starts to make the seat delay counter 73 count time in the Step S4. When the time period counted by the seat delay counter 73 is equal to or less than a predetermined time (the predetermined time has not passed during the non-seating time, step S5: NO) in Step S5, the controller 61 sets the seating flag (maintains a setting state) in step S3, as mentioned above. When the time period counted by the seat delay counter 73 is more than the predetermined time (the predetermined time has passed during the non-seating time, step S5: YES) in Step S5, the controller 61 resets the seating flag in Step S6. The above-mentioned predetermined time is preferably 1.5 seconds as an empirical rule. In this way, when the sitting operator stands up or gets off the main body 1, the controller 61 resets the seating flag after 1.5 seconds pass from the standing up or the getting off time. It is judged whether or not the operator is sitting by controlling the seating flag.

In FIG. 8, before standing up, the operator is sitting on the seat 4 in a state allowing operation in which the drive of the actuator is permissible. During the time within 1.5 seconds after the operator stands up from the seat 4, the seating flag is set and the operation of the actuator can not be prohibited based on the setting of the seating flag. Here, the descent of the mast is essentially important as the operation of the actuator. When noticing something unusual in the state of the load, the operator might get off or jump off the fork-lift truck and approach the fork. Using the seating flag, the operator can efficiently prevent attack by the fork. It is effective that the time from getting off the fork-lift truck to approaching the fork should be set to 1.5 seconds as an empirical rule. It is also effective that the time from standing up on the seat 4 to checking the fork and the load on the seat 4 should be set at 1.5 seconds as an empirical rule.

The logic circuit 62 outputs an electrically low state signal (ex. 0 V signal) corresponding to the ON state of the seat switch 62*a*. On the other hand, the logic circuit 62 outputs an electrically high state signal (ex. 5 V signal) corresponding to the OFF state of the seat switch 62*a*. Therefore, if the electric system of the logic circuit 62 is out of order, the logic circuit 62 outputs 0 V signal so that the controller 61 outputs to output the OFF state signal.

Next, the operation of the embodiment of the controlling method of the industrial truck according to the present invention will be described.

A forward inclination of the manual handle lever 42 corresponds to a raising operation of the mast. By the forward inclination of the manual handle lever 42, the spool of the first control valve 22 at the state position of FIG. 3 (the neutral portion 22N) moves (displaces) to the right (lift up direction) position in FIG. 3. The lift up direction portion 22U in the spool of the first control valve 22 is set to the operating position. The hydraulic oil of the hydraulic oil circulating circuit 16 passes through the fourth control valve 26 and branches at the three-direction distributor 28. Then, the hydraulic oil passes through the first check valve 37 and a line 74 in the right position of the lift up direction portion 22U. The switch valve 58 is opened by the pressure of the hydraulic oil of a hydraulic oil supply line 75 which connects with an output port of the first control valve 22. The hydraulic oil passing through the line 74 is supplied to each of the supply sides of the two lift cylinders 9 through a lift cylinder operation line 76. By this supply of the hydraulic oil, pistons 77 of the lift cylinders 9 are raised and the inner masts 7 are pushed up in the vertical direction together with the pistons 77. A part of the free oil at the side of the discharge of the lift cylinders 9 is refluxed to the oil tank 17 through a return line 78.

A backward inclination of the manual handle lever 42 (pulling the lever) corresponds to a lowering operation of the mast. By the backward inclination of the manual handle lever 42, the spool of the first control valve 22 at the state position of FIG. 3 (the neutral portion 22N) moves (displaces) to the left (lowering direction) position in FIG. 3. The lift down direction portion 22D in the spool of the first control valve 22 is set to the operating position. The hydraulic oil of the hydraulic oil circulating circuit 16 passes through the fourth control valve 26 and branches at the three-direction distributor 28. A first line 79 of the lifting down direction portion 22D makes the hydraulic oil from the three-direction distributor 2 pass through. The hydraulic oil is supplied to the second control valve 23, which controls the motion of the other actuator (the tilt cylinder 25). A second line 81 of the lift down direction portion 22D connects the switch valve 58 and a reflux line 83. An operation start signal 59 is outputted from the direction detecting switch 47 by the lifting down operation (the lifting down operation and pulling the lever). The controller 61 outputs the drive lock signal 65 corresponding to the operation start signal 59 to the drive lock solenoid 69. This causes that the lift lock valve 56 is ON and the switch valve 58 is opened. If the manual handle lever 42 is operated so that the switch valve 58 is opened, the hydraulic oil of the lift cylinder 9, which receives the weight of the inner mast 7 on the supply side of the lift cylinder 9, passes through the second line 81 and the reflux line 83 to the oil tank 17. As a result, the inner mast 7 can be lowered down.

The operation start signal 59 is an electrically high state signal (ex. 5 V signal) corresponding to the OFF state when there is no pulling operation of the manual handle lever 42, which is similar to the seating signal 63.

Figure 9:
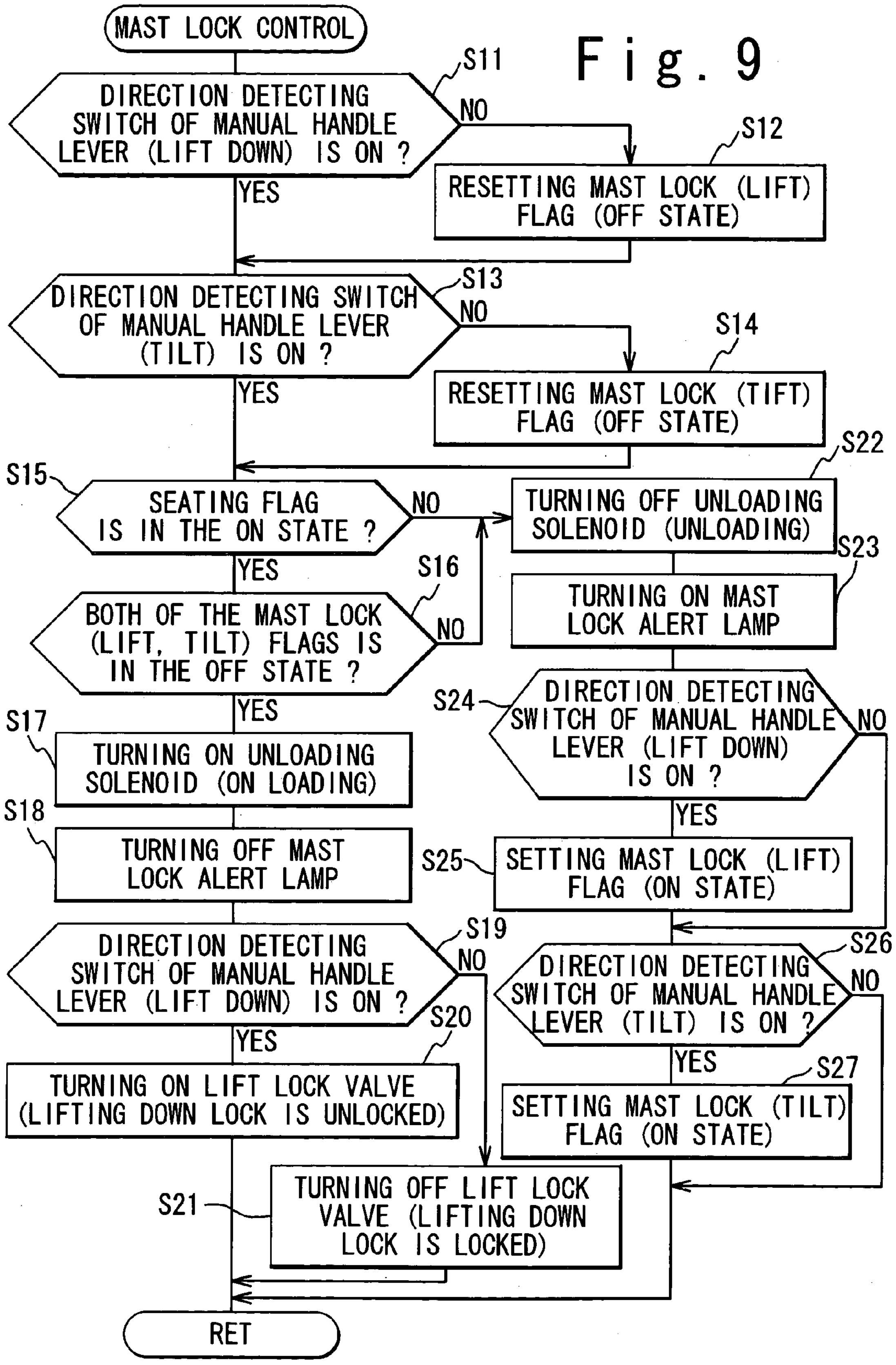
FIG. 9 is a flowchart showing the operation of the embodiment of the controlling method of the industrial truck according to the present invention.

FIG. 9 is a flowchart showing the operation of the embodiment of the controlling method of the industrial truck according to the present invention. A safety measure of the setting of the above-mentioned seating flag is incorporated into this embodiment. The embodiment is mainly described below as a mast lock control, especially the lift down operation of the manual handle lever 42.

In step S11 in FIG. 9, if the direction detecting switch 47 of the manual handle lever 42 is not ON (step S11: NO), that is the state of no pulling, the mast lock (lift) flag is reset (the OFF state) in step S12. Here, the mast lock (lift) flag is initialized to the ON state at the start.

If the direction detecting switch 47 is ON (step S11: YES), which is the state of pulling, the mast lock (lift) flag is in the same state as before.

In Step S13, if the direction detecting switch 47 of the manual handle lever 54 is not ON (step S13: NO), the mast lock (tilt) flag is reset (the OFF state) in step S14. Here, the mast lock (tilt) flag is also initialized to the ON state at the starting.

If the direction detecting switch 47 is ON (step S13: YES), the mast lock (tilt) flag is in the same state as before.

The state of another lock flag of the direction detecting switch 47 of the manual handle lever 55 for another actuator may be checked by the same process as steps S11 to S12.

When operation is started, the steps S12 and S14 should be processed. Therefore, a plurality of lock flags are reset (the OFF state) under the AND condition.

If the seating flag is set (in the ON state) as described in FIG. 8 in the step S15 (YES), and both of the mast lock (lift, tilt) flags is in the OFF state in the step S16 (YES), the process goes to the step S17. When operation is started, as both of the mast lock flags are in OFF state in the steps S12 and S14, the process goes to the step S17.

In step S17, the unloading solenoid 68 is operated to shut the unloading valve 41. Therefore, the control valves 18 come to a non-conductive state. In this condition, the actuators are possible to move. A mast lock alert lamp turns off that indicates all of the mast locks are released in step S18.

In this case, if the manual handle lever 42 moves (pulling operation) and the direction detecting switch 47 is ON, YES is selected in step S19. The drive lock solenoid 69 is moved in response to the drive lock signal 65 so as not to move the lock operation valve 57, then the switch valve 58 is opened in step S20. In this way, the lift lock valve 56 is in the ON state and the lifting down lock is unlocked (released).

On the other hand, if the manual handle lever 42 does not move (no pulling operation) and the direction detecting switch 47 is OFF, NO is selected in the step S19. The drive lock solenoid 69 is moved in response to the drive lock signal 65 so as to move the lock operation valve 57, then the switch valve 58 is closed in step S21. In this way, the lift lock valve 56 is in the OFF state and the lifting down lock is locked.

When the manual handle lever 42 is not operated (no pulling operation) so that the switch valve 58 is closed, the hydraulic oil of the lift cylinder 9, which receives the weight of the inner mast 7 on the supply side of the lift cylinder 9, is blocked off by the switch valve 58 and the inner mast 7 does not lower down.

On the other hand, if the manual handle lever 42 is operated (pulling operation) so that the switch valve 58 is opened, the hydraulic oil of the lift cylinder 9 is not blocked off by the switch valve 58. The hydraulic oil passes to the oil tank 17 through the second line 81 of the lift down direction 22D and the reflux line 83 connecting the second line 81 with the two-direction reflux gatherer 33. As a result, the inner mast 7 can be lowered down.

The control process turns to step S22 if the seating flag is in the OFF state or 1.5 seconds has not passed from the seating in the step S15 (step S15: NO). Also, the control process turns to step S22 if the seating flag is in the ON state in step S15 (step S15: YES) and concurrently at least one of the manual handle levers 42 and 54 is operated (the direction detecting switch 47 is ON) so that the mast lock (lift, tilt) flag is not in the OFF state in step S16 (step s16: NO).

In step S22, the unloading solenoid 68 does not move and the unloading valve 41 is opened. Therefore, the hydraulic oil can pass through the reflux route line 34 to the two-direction reflux gatherer 33. In this condition, the actuators are impossible to move. The mast lock alert signal 71 corresponding to this state is outputted. The mast lock alert lamp turns on in response to the mast lock alert signal 71 in step S23.

In steps S24 and S26 of the alert state, if at least one of the lift down operation of the manual handle lever 42 and the tilting operation of the manual handle lever 54 (and the other operation of the other actuator) is carried out, the mast lock (lift) flag and the must lock (tilt) flag (and the other actuator lock flag) are set. Then, the process returns to the step S11. If there is not such operations, the process returns to Step S11 without any change of the states of the lock flags.

When the operator does not sit on the seat 4, the unloading valve 41 is opened (Step S22), and the hydraulic oil on the discharge side in the hydraulic oil circulating circuit 16 refluxes to the oil tank 17 through the reflux route line 34. Here, the operation of the manual handle lever 42 does not give a driving force to the lift cylinder 9.

When there is the lifting down operation in step S11, the operator sits on the seat 4 in step S15 and the mast lock flag in the initial state is in the ON state, the process goes to step S22. The operation by the operator does not give a driving force to the lift cylinder 9.

When the mast lock flag is set in the ON state in step S25, there is the lift down operation in step S11 and the operator sits on the seat 4 in step S15, the process goes to step S22. The operation by the operator does not give a driving force to the lift cylinder 9.

Therefore, only after all the mast lock flags are reset in the OFF state, can the lift cylinder 9 be operated (moved).

According to the present invention, the safety of the mechanical control can be strengthened by adding electric signal logic.

What is claimed is:

1. A control system of an industrial truck, comprising:

a first switch for an industrial truck body, said first switch being operable to detect whether or not an operator sits down on a seat and to carry out a first operation based upon a detection result by said first switch;

a second switch for the industrial truck body, said second switch being operable to detect whether or not a device for operating an actuator is being operated and to carry out a second operation based upon a detection result by said second switch; and a hydraulic circuit which is usable for operating the actuator, said hydraulic circuit containing hydraulic fluid, and said hydraulic circuit including:

a control valve including a spool whose position is changeable by the device for operating the actuator, a first circulating line that includes said control valve, the hydraulic fluid being able to circulate through said first circulating line, a hydraulic line usable to connect said spool with the actuator, the hydraulic fluid being able to pass through the hydraulic line, a drive lock valve provided for said hydraulic line, a second circulating line connected in parallel with said first circulating line, said second circulating line not including said control valve, wherein the hydraulic fluid can bypass said control valve through said second circulating line, and an unloading valve operable in response to said first operation and included in said second circulating line, wherein said drive lock valve is operable to block said hydraulic line based on one of said first operation and said first and second operations, and wherein said unloading valve is operable to open to connect a point upstream of said unloading valve directly with a hydraulic fluid tank based on one of said first operation and said first and second operations.

2. The control system of claim 1, wherein said drive lock valve is operable to block said hydraulic valve in a closed position thereon when said first switch does not carry out the first operation.

3. The control system of claim 1, wherein the first operation comprises outputting a first signal indicating that the operator sits down on the seat and the second operation comprises outputting a second signal indicating that the device for operating an actuator is being operated.

4. The control system of claim 1, wherein the first operation is carried out when a predetermined time period has passed after a first status changes to a second status, said first status indicating that said first switch detects that the operator sits down on the seat, and said second status indicating that the operator does not sit down on the seat.

5. The control system of claim 1, wherein said unloading valve is structured and arranged to open to directly connect a point upstream of said unloading valve with said hydraulic fluid tank when said first switch does not carry out the first operation.

6. The control system of claim 1, further comprising a controller which is operable to control said drive lock valve and said unloading valve based on the one of said first operation and said first and second operations.

7. The control system of claim 1, wherein said second switch is operable to output an electric signal corresponding to operational positions of said device.

8. The control system of claim 1, wherein said actuator is operated using gravity against a machine element.

9. The control system of claim 8, wherein said machine element is one of a crane arm of a truck crane, a shovel of a shovel type excavator, a fork of a forklift truck, a ladder of a fire-fighting vehicle, a hatch of a refuse collector and a ramp of a car carrier.

10. A control method of an industrial truck, said industrial truck including:

a first switch for a body of the industrial truck, a second switch for the body, and a hydraulic circuit that is usable for operating an actuator of the industrial truck and that includes hydraulic fluid, the hydraulic circuit including:

a control valve including a spool whose position is changeable, a first circulating line that includes the control valve, the hydraulic fluid being able to circulate through said first circulating line, a hydraulic line usable to connect said spool with the actuator, the hydraulic fluid being able to pass through the hydraulic line, a drive lock valve provided for the hydraulic line, a second circulating line connected in parallel with the first circulating line, the second circulating line not including the control valve, wherein the hydraulic fluid can bypass the control valve through the second circulating line, and an unloading valve included in the second circulating line said control method comprising:

(a) detecting with the first switch whether or not an operator sits down on a seat of the industrial truck and carrying out a first operation based upon a detection result of said detecting with the first switch;

(b) detecting with the second switch whether or not a device for operating the actuator is being operated and carrying out a second operation based upon a detection result of said detecting with the second switch;

(c) blocking the hydraulic line using the drive lock valve based on one of the first operation and the first and second operations; and (d) opening the unloading valve to directly connect a point upstream of the unloading valve with a hydraulic fluid tank based on the one of the first operation and the first and second operations.

11. The control method of an industrial truck of claim 10, wherein said step (c) includes closing the drive lock valve to block the hydraulic line when the first switch does not carry out the first operation.

12. The control method of claim 10, wherein the first operation comprises outputting a first signal indicating that the operator sits on a seat of the industrial truck and the second operation comprises outputting a second signal indicating that the device for operating the actuator is being operated.

13. The control method of claim 10, wherein said step (a) includes:

(a1) detecting a first status in which the operator sits on the seat;

(a2) detecting a second status in which the operator does not sit on the seat; and (a3) carrying out the first operation when a predetermined time period passes after the first status changes to the second status.

14. The control method of claim 10, wherein the first operation takes priority over the second operation in said step (c).

15. The control method of claim 10, wherein said actuator is operated by using gravity against a machine element.

16. The control method of claim 10, wherein said step (b) includes:

(b1) detecting whether or not the device for operating the actuator is being operated in a predetermined direction, and (b2) carrying out the second operation when the device is being operated in the predetermined direction.

17. The control method of claim 10, wherein said step (d) includes opening the unloading valve to directly connect a point upstream of the unloading valve with the hydraulic fluid tank when the first switch does not carry out the first operation.

* * * * *